United States Patent [19]

Maier et al.

[11] 4,064,223

[45] Dec. 20, 1977

[54] PROCESS FOR THE PRODUCTION OF CONCENTRATED SULFURIC ACID AND/OR OLEUM FROM A WET SULFUR DIOXIDE FEED

[75] Inventors: Franz Maier, Markt Schwaben; Robert Peichl, Kelheim, both of Germany

[73] Assignee: Sud-Chemie AG, Munich, Germany

[21] Appl. No.: 655,027

[22] Filed: Feb. 3, 1976

[30] Foreign Application Priority Data

Feb. 12, 1975 Germany .............................. 2505828

[51] Int. Cl.$^2$ .............................................. C01B 17/72
[52] U.S. Cl. .................................. 423/522; 423/533
[58] Field of Search ................. 423/522, 533–538; 55/73

[56] References Cited

U.S. PATENT DOCUMENTS

| | | | |
|---|---|---|---|
| 2,471,072 | 5/1949 | Merrian | 423/522 |
| 3,374,061 | 3/1968 | Topsoe et al. | 423/522 |
| 3,593,497 | 7/1971 | Grimm et al. | 423/522 |
| 3,653,828 | 4/1972 | Connor et al. | 423/522 |
| 3,780,499 | 12/1973 | Dorr et al. | 423/532 |
| 3,788,043 | 1/1974 | Dorr et al. | 423/522 |
| 3,944,401 | 3/1976 | Dorr et al. | 423/522 |
| 3,950,493 | 4/1976 | Dorr et al. | 55/73 |

FOREIGN PATENT DOCUMENTS

| | | | |
|---|---|---|---|
| 471,653 | 9/1937 | United Kingdom | 423/522 |
| 1,288,835 | 9/1972 | United Kingdom | 423/522 |

Primary Examiner—O. R. Vertiz
Assistant Examiner—Gary P. Straub
Attorney, Agent, or Firm—Burgess, Dinklage & Sprung

[57] ABSTRACT

Concentrated sulfuric acid and/or oleum is prepared by the catalytic oxidation of sulfur dioxide to sulfur trioxide using a gas containing water vapor, $SO_2$ and oxygen. The catalytic oxidation is carried out in two stages. After the first stage an intermediate cooling of the reaction gas, and absorption of the water vapor content and an intermediate absorption of the sulfur trioxide formed in the first stage are performed. In the second stage the unreacted $SO_2$ is catalytically oxidized to $SO_3$ in the absence of water vapor, this $SO_3$ being absorbed in sulfuric acid. An apparatus for carrying out the process is disclosed including a primary catalysis stage, means for the intermediate cooling of the reaction gas, means for the removal of the water vapor content, means for the intermediate absorption of the $SO_2$ of the first stage, a secondary stage for the catalytic oxidation of the unreacted sulfur dioxide in the absence of water and an end absorption unit for $SO_2$ absorption produced in the secondary stage.

7 Claims, 1 Drawing Figure

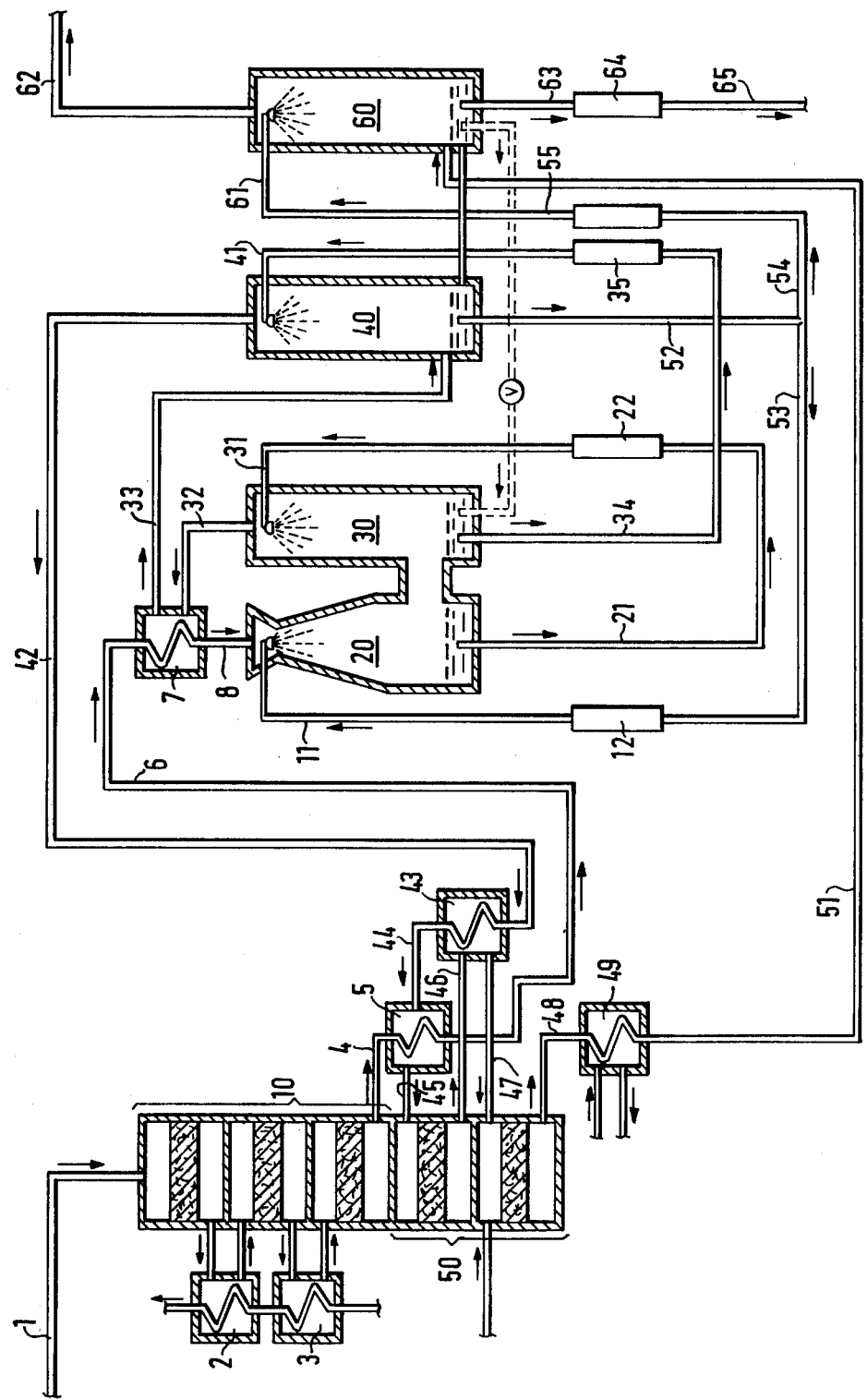

PROCESS FOR THE PRODUCTION OF CONCENTRATED SULFURIC ACID AND/OR OLEUM FROM A WET SULFUR DIOXIDE FEED

BACKGROUND

A number of methods are known for making use of sulfur compounds, such as hydrogen sulfide, carbon disulfide, carbon oxysulfide and mercaptans, contained in gases which also contain oxygen and moisture, for the production of sulfuric acid. These methods have it in common that the sulfur content of the gases must be completely oxidized to sulfur dioxide by combustion, and, depending on the concentration of the sulfur compounds in the gases, either the combustion is performed with heating oil, natural gas or other such fuels, or the gas containing the sulfur compounds is used as an oxidation gas in the roasting of sulfide ores, or else elemental sulfur is additionally burned, for the purpose of achieving a sulfur dioxide concentration that will be as constant as possible. In all cases, the gas obtained contains water vapor in addition to sulfur dioxide and oxygen; i.e., in addition to the water vapor present in the starting gas, more water vapor is produced by the combustion of the hydrogen sulfide or by the burning of the fuels containing hydrocarbons.

Such gases can be used for the production of 60% to 80% sulfuric acid without removing the water vapor (wet catalysis).

There is also a known procedure whereby, after cooling, demisting and drying, the sulfur dioxide contained in the oxygen- and water vapor-laden gases is oxidized catalytically to sulfur trioxide (dry gas catalysis) and the latter is absorbed, the end product being a 95 to 99% sulfuric acid. The preparation of these gases for contact activation involves relatively great expense. For example, the gas from the sulfur combustion must be greatly cooled, and then must be dried with concentrated sulfuric acid. Since furthermore sulfur trioxide mists are formed by the cooling, these mists must be settled prior to the drying process.

In the case of gases saturated with water vapor or containing much water vapor, a process has already been proposed in German Patent Application P 25 01 419.1, of which preliminary publication has not yet been made, in which the sulfur compounds contained in gases containing oxygen are utilized by removing the water vapor content by treating the gases with a glycol, and the dried gas, still containing sulfur compounds, is used as an oxidation gas for the burning of sulfur or for the roasting of sulfidic ores in the production of highly concentrated sulfuric acid.

When such a gas contains sulfur in the form of hydrogen sulfide compounds, water vapor is formed during the subsequent combustion or roasting in the presence of oxygen. The same is the case when the burning is performed with fuels containing hydrocarbons.

THE INVENTION

The invention is addressed to the problem of using gases containing inert compounds, sulfur dioxide and oxygen in addition to water vapor for the production of concentrated sulfuric acid and/or oleum in a simple and economical manner.

The invention thus concerns a process for the production of concentrated sulfuric acid and/or oleum by the catalytic oxidation of sulfur dioxide to sulfur trioxide using a gas containing water vapor in addition to inert components, sulfur dioxide and oxygen, and the absorption into sulfuric acid of the sulfur trioxide that is formed. The process is characterized by the fact that the catalytic oxidation of the sulfur dioxide to sulfur trioxide is performed in two stages; the first stage, in which the sulfur dioxide is partially oxidized to sulfur trioxide in the presence of water vapor on a primary catalyst is followed by an intermediate cooling of the reaction gas, an absorption of its water vapor content, and an intermediate absorption into sulfuric acid of the sulfur trioxide formed in the said first stage, and then, in the second stage, the unreacted sulfur dioxide is catalytically oxidized to sulfur trioxide on a secondary catalyst in the absence of water vapor, and the sulfur trioxide is absorbed into sulfuric acid.

The starting gas that is used in accordance with the invention generally has a sulfur dioxide content of 6 to 10%, and preferably 7 to 9.5%, by volume, and an oxygen content of about 10 to 19%, usually 10 to 17%, by volume. The water vapor content can amount to as much as 35 g/Nm$^3$, and preferably up to 20 g/NM$^3$. Usually, the water vapor is present in an amount of 5 to 20 g g/NM$^3$.

A gas of this kind is obtained, for example, by burning with elemental sulfur a production exhaust gas from the production of viscose, which has been partially dried with a glycol, usually triethylene glycol, and which after this partial drying still contains hydrogen sulfide and carbon disulfide. However, other gases having a similar composition can be used as the starting gas for the present process.

The catalytic oxidation of the sulfur dioxide to sulfur trioxide takes place both in the primary converter and in the secondary converter with the catalysts conventionally used for this purpose. Also, the reaction temperatures and the volume rates are ordinarily the same as in the known sulfuric acid contact processes.

In a preferred embodiment of the process of the invention, the cooling of the reaction gas, the absorption of the water vapor content and the intermediate absorption of the sulfur trioxide formed in the first stage are performed in separate units. This has the advantage that the gas temperatures as well as the temperatures and concentrations of the sulfuric acid can be better controlled in each unit. Preferably the reaction gas emerging from the cooling stage is further cooled in the water vapor absorption unit, and warmed again before it enters the intermediate absorption unit. In general, when the reaction gas comes from the primary converter it has a temperature of about 470° to 500° C. First it is cooled in the manner described further below to about 180° to 200° C, and at this temperature it enters the cooling unit. After the cooling has been performed with sulfuric acid, the removal of water vapor takes place in the next unit through contact with cold sulfuric acid. Before the gas enters the intermediate absorption unit it is reheated. The gas emerging from the intermediate absorption unit, still containing traces of water vapor and sulfur trioxide as well as sulfur dioxide, is heated to the required reaction temperature and carried to the secondary converter in which the sulfur dioxide that has not reacted in the primary converter is oxidized to sulfur trioxide, which is absorbed into sulfuric acid in a known manner in the final absorption unit that follows. The gas emerging from the final absorption unit is released to the atmosphere or, if necessary, is subjected to final scrubbing.

The intermediate cooling of the reaction gas, the removal of water vapor and the intermediate absorption of the sulfur trioxide formed in the first stage are performed with sulfuric acid, which is preferably recycled. This is accomplished as follows: The reaction gas entering the cooling unit with a temperature of about 180° to 200° C is cooled with 96 to 99% sulfuric acid; the hot sulfuric acid leaving the cooling unit is cooled and fed into the water vapor absorption unit where it is brought into contact with the reaction gas. The acid leaving after the water vapor removal is again cooled and concentrated and is brought into contact with the reaction gas in the intermediate absorption unit to absorb the sulfur trioxide formed in the first stage. The absorber acid formed by the absorption of the sulfur trioxide in the intermediate absorption unit is adjusted by the addition of dilute acid or water to the concentration required in the cooling unit. A portion of this acid is recycled to the cooling unit, thereby completing the acid circuit. Another portion of this acid is continuously removed from circulation and, after being concentrated to the absorber circuit concentration, it is used in the final absorption unit for the absorption of the sulfur trioxide formed in the second stage.

It is advantageous to perform the oxidation of the sulfur dioxide in the primary converter in a plurality of stages, the oxidation heat that is produced being used between the primary converter stages for the superheating of steam. The reaction gas leaves the final primary converter stage with a temperature of about 470° to 500° C, and the heat content of this gas is used for the heating of the gas entering the secondary converter and the reaction gas entering the intermediate absorption unit.

The oxidation of the sulfur dioxide in the secondary converter is advantageously performed in a plurality of steps, the reaction heat being utilized within the overall system.

The invention furthermore concerns an apparatus for the performance of the above-described process, and is characterized by the following features:

A primary catalysis stage for the partial catalytic oxidation of sulfur dioxide to sulfur trioxide in the presence of water vapor; apparatus for the intermediate cooling of the reaction gas emerging from the primary catalysis stage for the removal of the water vapor content and for the intermediate absorption of the sulfur trioxide formed in the first stage by means of sulfuric acid; and a secondary catalysis stage for the catalytic oxidation of the unreacted sulfur dioxide in the absence of water vapor, which is followed by a final absorption unit for the absorption of the sulfur trioxide produced in the secondary catalysis stage.

The apparatus for the intermediate cooling of the reaction gas, for the absorption of the water vapor content and for the intermediate absorption of the sulfur trioxide are preferably constructed as separate units.

A heat exchanger is preferably provided in the input of the cooling unit to heat the reaction gas passing from the water vapor absorption unit into the intermediate absorption unit. Furthermore, the cooling unit, the water vapor absorption unit and the intermediate absorption unit are interconnected by sulfuric acid lines having built-in coolers.

The invention will now be explained with the aid of the drawing.

The input gas, which contains water vapor in addition to inert components, sulfur dioxide and oxygen, is carried by line 1 into the primary catalytic converter 10. In this embodiment the primary catalytic converter is a three-stage converter in which the heat exchanger 2 is provided between the first and second stages and the heat exchanger 3 between the second and third stages for the purpose of utilizing the heat of the reaction gases for the production of high pressure steam. The reaction gas enters heat exchanger 2 at about 560° to 600° C and leaves it at about 450° C, and it enters heat exchanger 3 at about 520° C and leaves it at about 450° to 460° C.

The reaction gas leaves the final stage of the primary catalytic converter 10 through a line 4 which carries it through a heat exchanger 5. The reaction gas is thus cooled to about 310° to 320° C and passes through a line 6 into an additional heat exchanger 7 and is discharged therefrom through line 8 into the cooling unit 20. In this unit the reaction gas at a temperature of about 180° to 220° C comes in contact with 96 to 99% sulfuric acid which is delivered to the cooling unit through line 11. The reaction gas, cooled to about 40° to 60° C, is introduced into the water vapor absorption unit 30 in which it comes in contact with cold sulfuric acid from line 31. The sulfuric acid removes the water vapor content of the reaction gas and the latter flows at a temperature of about 40° C through line 32 into heat exchanger 7 in which it is heated by the hot reaction gas carried through line 6 to a temperature of about 200° C. At this temperature the reaction gas passes through line 33 into the intermediate absorption unit 40 into which an approximately 99% absorber sulfuric acid is fed through line 41. In the intermediate absorption unit, the sulfur trioxide formed in the primary converter 10 is absorbed, and the gas, which now contains only unreacted sulfur dioxide, oxygen and inert gas plus traces of sulfur trioxide and water vapor, is fed through line 42 into the heat exchanger 43 in which it is preheated by the heat of the reaction gases between the first and the second stage of the secondary converter 50. After passing through heat exchanger 43, the gas flows through line 44 into heat exchanger 5 where it is heated to a temperature of about 400° to 420° C, and from there it flows through line 45 into the first stage of the secondary converter 50. After passing through this stage the gas is carried through line 46 into the heat exchanger 43 and from there through line 47 into the second stage of the secondary converter 50. In secondary converter 50 a virtually complete oxidation of the unreacted sulfur dioxide to sulfur trioxide takes place, and the reaction gas flows through line 48 at a temperature of about 425° C out of the second stage of the secondary converter. It then flows through a heat exchanger 49 and passes through a line 51 into the final absorption unit 60 which cooled absorber sulfuric acid is fed through line 61. In the final absorption unit 60, the sulfur trioxide formed in the secondary converter 50 is absorbed, and the end gas is discharged through line 62 into the atmosphere or into the end gas scrubber which is not shown.

The 96 to 99% sulfuric acid put into the cooling unit 20 is precooled by the cooler 12. The sulfuric acid which is used for the cooling of the reaction gas and has thus absorbed heat leaves the cooling unit 20 through line 21 and is carried through the cooler 22 in which it is cooled down to about 40° C. Then the acid passes through line 31 into the water vapor absorption unit 30 and leaves it through line 34. Then it is delivered through the cooler 35 and line 41 into the intermediate absorption unit 40.

A portion of the acid produced in the intermediate absorption unit 40 passes through lines 52 and 53 and cooler 12 and through line 11 with a concentration of 96 to 99%, back into the cooling unit 20. The other portion of the acid produced is delivered through line 54, cooler 55 and line 61 and, after adjustment to the concentration of the absorber acid, to the end absorption unit 60 where it absorbs the sulfur trioxide produced in the secondary converter 50. The acid produced is delivered through line 63, cooler 64 and line 65 and, after adjustment to the desired final concentration, to the acid storage facility or to the purchaser.

We claim:

1. In a process for the production of concentrated sulfuric acid and/or oleum by the catalytic oxidation of $SO_2$ to $SO_3$ using a gas which contains water vapor in addition to inert components, $SO_2$ and oxygen, and absorption of the $SO_2$ is sulfuric acid, the improvement which consists essentially of the steps of
   a. passing a wet gas containing at least 5 g/Nm$^3$ and up to 35 g/Nm$^3$ water vapor in a first stage over a primary catalyst so as to oxidize the $SO_2$ to $SO_3$,
   b. contacting the reaction gas emerging from step (a) with cold 96 to 99% sulfuric acid so as to cool said gas from an inlet temperature of about 180° to 200° C to an exit temperature of about 40° to 60° C,
   c. absorbing the water vapor content of the gas emerging from step (b) with cold 96 to 99% sulfuric acid in a separate unit,
   d. reheating the gas emerging from step (c),
   e. contacting the gas emerging from step (d) in an intermediate absorption unit with 98 to 99% sulfuric acid so as to absorb substantially all $SO_3$ formed in step (a),
   f. oxidizing the unreacted $SO_2$ in the gas emerging from step (e) in a second stage on a secondary catalyst substantially in the absence of water vapor,
   g. absorbing the $SO_3$ from the gas emerging from step (f) in sulfuric acid.

2. A process according to claim 1 wherein the water vapor content of the gas is in the range of 5 to 20 g/Nm$^3$.

3. A process according to claim 2 wherein the sulfuric acid employed in step (c) has a temperature of about 40° C.

4. Process of claim 1 wherein the hot sulfuric acid withdrawn from step (b) is cooled and is brought into contact with the reaction gas in step (c) to absorb the water vapor content, the acid withdrawn from step (c), after another cooling and concentration, is brought into contact with the reaction gas in step (e) to absorb the $SO_3$ formed in the first stage, a portion of the outflowing acid, after adjustment of a concentration of 96 to 99%, is recycled to step (c) and the other portion is continuously removed from the circuit as produced acid, and part of said acid, after concentration, is used for the absorption of the $SO_3$ formed in step (f).

5. A process according to claim 1 wherein in step (a) only a portion of the $SO_2$ is oxidized to $SO_3$.

6. Process of claim 1 wherein the partial oxidation of the $SO_2$ in step (a) in the first stage is performed on a multiple-stage primary catalyst and the heat between the primary catalysis stages is used for the superheating of steam, and the heat content of the reaction gas after the final primary catalysis stage is used for heating the gas entering step (f) containing the secondary catalyst and the reaction gas entering step (e).

7. Process of claim 1 wherein the oxidation of the $SO_2$ in step (f), in the second stage, is performed on a multi-stage secondary catalyst and the heat between the secondary catalysis stages is utilized in the system.

* * * * *

UNITED STATES PATENT AND TRADEMARK OFFICE
CERTIFICATE OF CORRECTION

PATENT NO. : 4,064,223
DATED : December 20, 1977
INVENTOR(S) : Franz Maier et al It is certified that error appears in the above-identified patent and that said Letters Patent are hereby corrected as shown below:

[73] Assignee, Title Page, "Sud" should read -- Süd --.

Column 2, lines 21 & 23 "/NM$^3$", each occurrence should read -- /Nm$^3$ --.

Column 2, line 23, delete "g" first occurrence.

Column 5, line 20, "is" should read -- in --.

Signed and Sealed this

Fourth Day of July 1978

[SEAL]

Attest:

RUTH C. MASON
Attesting Officer

DONALD W. BANNER
Commissioner of Patents and Trademarks